United States Patent Office 2,899,276
Patented Aug. 11, 1959

2,899,276

PROCESS FOR PREPARING DENSE FILTERABLE BERYLLIUM HYDROXIDE

Jean-Claude Hutter, Salindres, France, assignor to Pechiney, Compagnie de Produits Chimiques et Electrometallurgiques, Paris, France, a corporation of France No Drawing. Application June 5, 1956
Serial No. 589,390

Claims priority, application France June 21, 1955

6 Claims. (Cl. 23—183)

When it is desired to prepare beryllium oxide, or a salt of beryllium, it is often advisable to use an intermediate berryllium hydroxide the precipitation of which makes possible a concentration treatment if one starts from weak solutions, or a purification treatment if one starts from impure solutions of one of its salts.

In any case, it is necessary to wash and filter this hydroxide and, consequently (it is necessary) to obtain by precipitation a dense and crystalline hydroxide devoid, as far as possible, of adsorbing properties.

Beryllium hydroxide is known in three allotropic forms which are described in "Gmelins Handbuch der Anorganischen Chemie," 8th edition, No. 26, pages 98 and 99, as follows:

The amorphous form obtained by neutralizing a solution of a beryllium salt with an alkaline solution.

The metastable crystalline "alpha" form, obtained by aging the preceding form. The transformation may be hastened by stirring and heating in a dilute alkaline medium.

The stable crystalline "beta" form obtained by hydrolyzing solutions of alkali metal beryllates. By stirring the amorphous form in a strong alkaline, hot medium, there is obtained a mixture of "alpha" and "beta" forms.

The first two forms yield low density precipitates, difficult to wash and which retain appreciable amounts of water.

Only the third form yields dense, crystallized precipitates but, until now, it did not appear possible to prepare it in a practical and reproducible manner other than by hydrolyzing alkali metal beryllate solutions and, in that particular case in spite of the favorable physical texture of the product, it was found difficult to eliminate completely the alkali metal ions by washing.

As a result of his investigations, applicant has discovered that it is possible to precipitate beryllium hydroxide directly in the "beta" form from a solution of a beryllium salt by neutralizing the latter with an alkali base, preferably with ammonia, under predetermined conditions of pH and of temperature. In fact, applicant has discovered that:

(a) With a pH below 6, basic beryllium salts are obtained whatever be the concentration and temperature. The salts have a rubbery texture, if the precipitation temperature is high and the concenration sufficient;

(b) With a pH ranging between 6 and 8.5, sufficient concentration and a temperature close to boiling, a crystallized precipitate of "beta" hydroxide is obtained; however, with a weak concentration or with too low a temperature, there is obtained a mixture of "alpha," "beta" and amorphous forms;

(c) With a pH above 8.5, there is obtained a bulky precipitate of amorphous hydroxide whatever the concentration and temperature.

Furthermore, applicant has established that it is preferable to carry out the neutralization in the presence of beryllium hydroxide which has already been precipitated and which acts as a seeding material.

Accordingly, the process forming the object of the present invention consists in introducing simultaneously a solution of beryllium salts and an alkaline solution (or gas, if ammonia be used) into a vessel provided with a stirrer and, eventually also containing a suspension of precipitated beryllium hydroxide, in such a way that the pH of the suspension remains constantly between 6 and 8.5.

The temperature is kept at about 100° and, if continuous working be desired, an amount of suspension equal to that formed by the addition of reagents is withdrawn from the vessel so that the level of the suspension in the vessel remains constant.

The resultant suspension can be washed by decantation or filtration or, by a combination of these two methods; the cake of beryllium hydroxide obtained can then be employed for the uses for which it is intended.

"Beta" beryllium hydroxide obtained under these conditions is constituted of particles some tens of microns in size; its apparent bulk density after drying amounts to 0.8 to 1.2; however, it contains small amounts of the anion of the salt which formed the treated solution, probably, in the form of basic salts of beryllium; the anion content remaining after washing depends upon the pH of the precipitation and upon the nature of the salt used; nevertheless, it always amounts to between 2 and 8%.

Example 1

Into a vessel of 2000 litres capacity, containing 200 litres of boiling water, there are poured with stirring 500 litres beryllium sulfate solution per hour; the concentration of the solution corresponds to 50 g. beryllium oxide per litre. The temperature is kept at 98–100° C. by injection of steam and, simultaneously, gaseous ammonia is introduced into the vessel in such an amount that the pH is maintained between 6 and 8.5, preferably around 7.5.

The operation is stopped when 1500 litres of solution have been introduced.

The resultant precipitate is filtered off and washed; there are obtained on the filter 185 kg. of cake which contains:

| | Percent |
|---|---|
| $Be(OH)_2$ | 70 |
| $SO_3$ | 2.5 |
| $H_2O$ | 27.5 |

The beryllium hydrate is in the form of crystals of "beta" hydroxide, having an average diameter of the order of 25 microns; following drying, its bulk density is 0.85.

Example 2

The operation is carried out as in Example 1 but instead of stopping it, the addition of reagents is continued while maintaining a constant level by running off the resultant suspension.

The beryllium hydrate contained in this suspension is subjected to systematic washing by decantation and is then filtered off. When normal conditions have been attained, there are obtained, per hour, 57 kg. of cake having the following composition:

| | Percent |
|---|---|
| $Be(OH)_2$ | 75 |
| $SO_3$ | 2.5 |
| $H_2O$ | 22.5 |

The beryllium hydrate is in the form of "beta" hydroxide crystals which, in the selected example, had the following average diameters (expressed in microns):

| | Percent |
|---|---|
| Above 65 | 0 |
| 40 to 65 | 22 |
| 30 to 40 | 44 |
| 20 to 30 | 30 |
| 10 to 20 | 4 |
| Below 10 | 0 |

Following drying, its bulk density is 1.1.

The above examples are not given by way of limitation; solutions of other soluble beryllium salts can be substituted for the sulfate solutions without modifying the principle of the invention. Also, in lieu of the ammonia, in the gaseous state or in solution, there can be substituted another alkaline solution such as sodium hydroxide or other alkali metal hydroxide, or any other suitable base; however, care has to be taken to determine in each particular case the most suitable precipitation pH within the limits above indicated.

I claim:

1. Process for the direct preparation of dense, filterable, crystalline beryllium hydroxide by neutralizing a solution of a beryllium salt by means of a base, comprising the steps of: simultaneously introducing the beryllium salt solution and the base into a reaction zone; maintaining the temperature in the reaction zone close to the boiling point of the solution; maintaining the pH in the reaction zone in the range between 6 and 8.5, and thereby obtaining a precipitate of stable, granular crystalline beryllium hydroxide, and recovering said precipitate.

2. Process according to claim 1, wherein the precipitation takes place in the presence of added seed crystals of stable, granular beryllium hydroxide.

3. Process according to claim 1, wherein ammonia is the base used in the precipitation.

4. Process according to claim 1, wherein the pH is maintained at about 7.5.

5. Process according to claim 1, wherein the temperature in the reaction zone is maintained at about 98°–100° C.

6. Process for the direct preparation of dense, filterable, crystalline beryllium hydroxide by neutralizing a solution of a beryllium salt by means of a base, comprising the steps of: simultaneously introducing the beryllium salt solution and the base into a reaction zone, the concentration of said solution corresponding to 50 g. beryllium oxide per litre; maintaining the temperature in the reaction zone close to the boiling point of the solution; maintaining the pH in the reaction zone in the range between 6 and 8.5, and thereby obtaining a precipitate of stable, granular, crystalline beryllium hydroxide, and recovering said precipitate.

References Cited in the file of this patent

UNITED STATES PATENTS

| | | |
|---|---|---|
| 1,559,703 | Howard | Nov. 3, 1925 |
| 1,797,994 | Morrow | Mar. 24, 1931 |
| 2,415,074 | Clark et al. | Feb. 4, 1947 |
| 2,656,266 | Calmeyer | Oct. 20, 1953 |
| 2,657,115 | Ashley | Oct. 27, 1953 |
| 2,738,255 | Sullivan et al. | Mar. 13, 1956 |

OTHER REFERENCES

J. W. Mellor's "A Comprehensive Treatise on Inorganic and Theoretical Chemistry," vol. 4, 1923 ed., pages 224 to 228, Longmans, Green and Co., N.Y.